Figure 1:
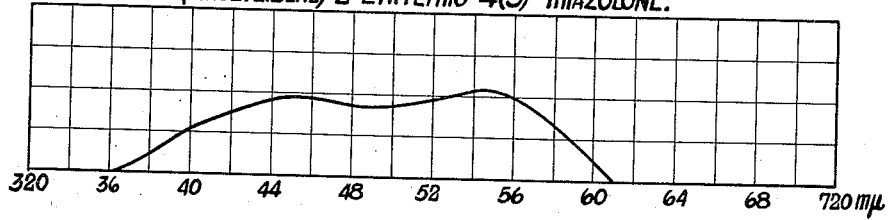

Oct. 24, 1939.     L. G. S. BROOKER     2,177,402
DYE FROM THIAZOLONES
Filed Aug. 13, 1936     2 Sheets-Sheet 1

5-(1-ETHYL-4-QUINOLYLIDENE)-2-ETHYLTHIO-4(5)-THIAZOLONE.

2-DIPHENYLAMINO-5-(2-ETHYL-1-BENZOTHIAZYLIDENE-ETHYLIDENE)-4(5)-THIAZOLONE.

5-(2-ETHYL-3,4-BENZO-BENZOTHIAZYLIDENE-ETHYLIDENE)-2-DIPHENYLAMINO-4(5)-THIAZOLONE.

5-(1-ETHYL-2-QUINOLYLIDENE-ETHYLIDENE)-2-METHYLTHIO-4(5)-THIAZOLONE.

Leslie G. S. Brooker,
INVENTOR:
BY  N. M. Perrins
Daniel J. Mayne
ATTORNEYS.

Oct. 24, 1939.  L. G. S. BROOKER  2,177,402
DYE FROM THIAZOLONES
Filed Aug. 13, 1936    2 Sheets-Sheet 2

5-(2-Ethyl-1-Benzoxazylidene-Ethylidene)-2-Methylthio-4(5)-Thiazolone.

5-(2-Ethyl-1-Benzoxazylidene-Ethylidene)-2-Ethylphenylamino-4(5)-Thiazolone.

5-(2-Ethyl-1-Benzoxazylidene-Ethylidene)-2-Methylphenylamino-4(5)-Thiazolone

2-Diphenylamino-5-(2-Ethyl-1-Benzoxazylidene-Butenylidene)-4(5)-Thiazolone.

Leslie G. S. Brooker,
INVENTOR:

BY

ATTORNEYS.

Patented Oct. 24, 1939

2,177,402

UNITED STATES PATENT OFFICE 2,177,402

DYE FROM THIAZOLONES

Leslie G. S. Brooker, Rochester, N. Y., assignor, by mesne assignments, to Eastman Kodak Company, Rochester, N. Y., a corporation of New Jersey Application August 13, 1936, Serial No. 95,928
In Great Britain November 15, 1935

17 Claims. (Cl. 260—240)

This invention relates to dyes from thiazolones. More particularly, this invention relates to merocyanine dyes from thiazolones and to a process for the preparation thereof. These merocyanine dyes serve to alter the sensitivity of photographic emulsions.

This application is a continuation-in-part of my copending application, Serial No. 752,036, filed November 8, 1934, (now United States Patent No. 2,078,233, dated April 27, 1937) which is in turn a continuation-in-part of my copending application, Serial No. 739,502, filed August 11, 1934. In my copending application Serial No. 752,036, are described photographic emulsions containing photographic sensitizing dyes characterized by the following grouping:

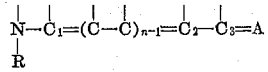

wherein A represents a divalent atom, such as oxygen or sulfur, $n$ represents a positive integer, R represents an alkyl group, the carbon atom $C_1$ and the nitrogen atom are situated in a heterocyclic ring system and the carbon atoms $C_2$ and $C_3$ are situated in another heterocyclic ring system. In my copending application Serial No. 752,036, these dyes are referred to as N-alkyl-heterocyclylidene, N-alkyl-heterocyclylidene-ethylidene and N-alkyl-heterocyclylidene-butenylidene derivatives of heterocyclic compounds containing a reactive methylene group, depending upon whether $n$ represents 1, 2 or 3, etc. It has recently been proposed to refer to this new class of dyes under the name "merocyanine". Accordingly, when $n$, in the above formula, represents one, the dyes are conveniently referred to as "simple merocyanines", when $n$ represents two, as "merocarbocyanines" and when $n$ represents three, as "merodicarbocyanines," etc.

My copending application Serial No. 752,036 describes specifically photographic emulsions containing simple merocyanine, merocarbocyanine and merodicarbocyanine dyes from rhodanines (2-thio-2,4(3,5)-thiazolediones), 5-thiopyrazolones, 2,4,6-triketohexahydropyrimidines and 2-thionaphthenones (thioindoxyls). The instant application is directed to merocyanine dyes from thiazolones and to a process for the preparation thereof. These merocyanine dyes from thiazolones can be represented by the following general formula:

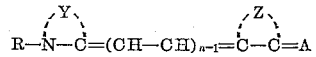

and

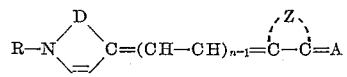

wherein A represents a divalent atom, such as oxygen or sulfur, D represents a phenylene group, $n$ represents a positive integer not greater than three, R represents an alkyl group, Y represents the non-metallic atoms necessary to complete a five-membered heterocyclic nucleaus, such as an oxazole nucleus (for example oxazole, benzoxazole or naphthoxazole nuclei), a thiazole nucleus (for example simple thiazole, benzothiazole or naphthothiazole nuclei), a thiazoline nucleus, a selenazole nucleus (for example simple selenazole or benzoselenazole) or a selenazoline nucleus, or Y represents the non-metallic atoms necessary to complete a six-membered heterocyclic nucleus, such as pyridine or a quinoline nucleus (for example simple quinoline or naphthoquinoline) and Z represents the non-metallic atoms necessary to complete a thiazolone nucleus, such as a 2,4-dithio-2,4(3,5)-thiazoledione (4-thiorhodanine) nucleus, a 4-thiazolidone nucleus, a 2-substituted-amino-4(5)-thiazolone nucleus (for example a 2-dialkylamino-4(5)-thiazolone, a 2-alkylphenylamino-4(5)-thiazolone or a 2-diphenylamino-4(5)-thiazolone nucleus), a 2,4(3,5)-thiazoledione nucleus or a 2-substituted-mercapto-4(5)-thiazolone nucleus (for example a 2-alkylthio-4(5)-thiazolone nucleus). Thiazolone nuclei contain a nuclear nitrogen atom and a nuclear sulfur atom.

These new simple merocyanine dyes, where $n$ represents one, can be prepared by condensing a cyclammonium quaternary salt, such as an oxazole, a thiazole, a thiazoline, a selenazole, a selenazoline, a pyridine or a quinoline quaternary salt, containing a substituted mercapto group in the alpha or gamma, i. e., one of the so-called reactive positions, with a thiazolone containing a nuclear reactive methylene group, i. e. a nuclear methylene group adjacent to a nuclear carbonyl or thiocarbonyl group, advantageously in the presence of a basic condensing agent. The reaction can be illustrated by reference to the specific condensation of 1-phenylthiobenzothiazole ethiodide with 4-thiazolidone, in the presence of triethylamine.

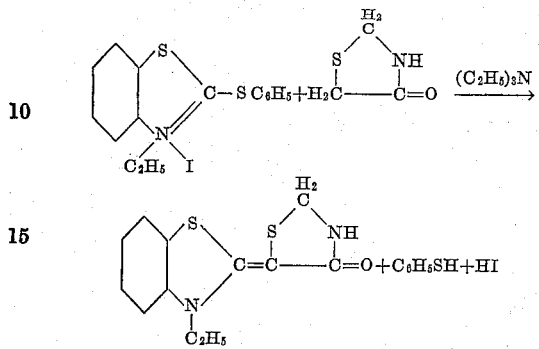

Such a dye is called 5-(2-ethyl-1-benzothiazylidene)-4-thiazolidone. In carrying out this type of condensation, I have found it advantageous to employ strong tertiary organic bases as condensing agents, though inorganic condensing agents, such as sodium carbonate or potassium hydroxide can be used. Heating accelerates the reaction.

The following examples serve to illustrate the procedure employed in preparing these new dyes where $n$ represents one. However, I do not intend that these examples limit my invention.

EXAMPLE 1.—5-(2-ethyl-1-benzothiazylidene)-2-diphenylamino-4(5)-thiazolone 0.45 g. (1 mol.) of 2-diphenylamino-4(5)-thiazolone, 0.56 g. (1 mol.) of 1-methylthiobenzothiazole ethiodide and 0.18 g. (1.05 mol.) of triethylamine were refluxed in absolute ethyl alcohol (15 cc.) for about fifteen minutes. The dye separated from the chilled solution. Following recrystallization from glacial acetic acid, the dye was obtained as a pale yellow powder. The dye can be represented by the following formula:

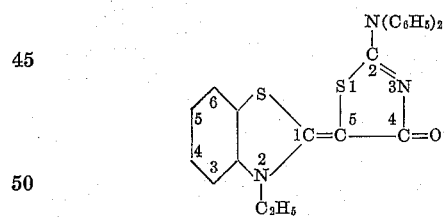

EXAMPLE 2.—5-(1-ethyl-2-quinolylidene)-3-phenyl-2,4(3,5)-thiazoledione 1 g. (1 mol.) of 3-phenyl-2,4(3,5)-thiazoledione, 2.1 g. (1 mol.) of 2-iodoquinoline ethiodide and 1.06 g. (2.1 mols.) of triethylamine were refluxed together in 20 cc. of absolute ethyl alcohol for about 15 minutes. The dye separated from the chilled reaction mixture. After recrystallization from methyl alcohol, it was obtained as glistening reddish brown crystals which gave an orange solution in methyl alcohol. It can be represented by the following formula:

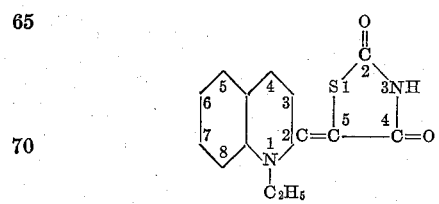

In a similar manner 2,4-dithio-2,4(3,5)-thiazoledione, 4-thiazolidone and other 2-amino-4(5)-thiazolones, such as 2-diethylamino or 2-phenylethylamino-4(5)-thiazolones, can be condensed with 2-phenylthioquinoline or 1-methylthiobenzothiazole ethiodide or other quaternary salts thereof, such as other alkyl halides, alkyl p-toluenesulfonates, alkyl sulfates, perchlorates or the like. Mercapto derivatives other than the phenylthio and methylthio can be used, for example, n-butylthio, p-chlorophenylthio, β-naphthylthio, pyrazolonylthio, benzothiazylthio or the like. Such mercapto derivatives of quaternary salts of other than quinoline and benzothiazole can be used, for example, pyridine, naphthothiazoles, benzoselenazole, thiazoline, selenazole, selenazoline, naphthoxazole, etc. Such dyes and the above process for the preparation thereof are disclosed in the copending application of Leslie G. S. Brooker and Russel H. Van Dyke, Serial No. 29,917, filed July 5, 1935.

The most convenient method of preparing these new dyes where $n$ represents one and which are derived from 2-substituted-mercapto-4(5)-thiazolones is to take a dye prepared by condensing, in the presence of a basic condensing agent, rhodanine, i. e., 2-thio-2,4-(3,5)-thiazoledione, with a cyclammonium quaternary salt, containing a substituted-mercapto group or a halogen atom in a reactive position, and treat the so-prepared dye with an alkylating agent. The reaction can be illustrated by the following specific reaction of 5-(1-ethyl-4-quinolylidene)-rhodanine with an alkylating agent:

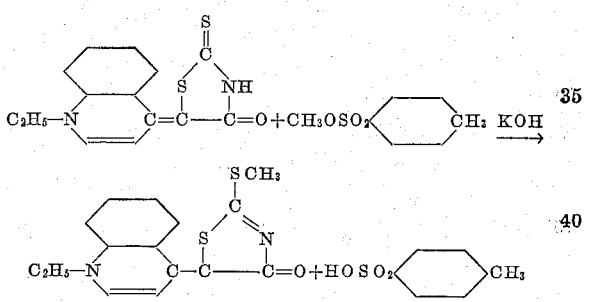

Such a dye is called 5-(1-ethyl-4-quinolylidene)-2-ethylthio-4(5)-thiazolone. The alkylating agents employed can be other than alkyl p-toluenesulfonates, for example, alkyl sulfates or alkyl iodides. The alkylation is advantageously carried out in the presence of bases, such as sodium or potassium hydroxides or carbonates. The following examples serve to illustrate the preparation of these dyes from 2-mercapto-4(5)-thiazolones, but are not intended to limit my invention.

EXAMPLE 3.—5-(1-ethyl-4-quinolylidene)-2-methylthio-4(5)-thiazolone 0.72 g. (1 mol.) of 5-(1-ethyl-4-quinolylidene)-rhodanine was suspended in 20 cc. of 95% ethyl alcohol and 0.2 g. (1 mol.) of powdered potassium hydroxide (85%) was added followed by 0.6 g. (1.2 mol.) of methyl-p-toluenesulfonate. The whole was refluxed for about an hour. The dye separated from the cooled reaction mixture. After recrystallization from methyl alcohol, the dye was obtained as reddish needles having a blue reflex. The dye can be represented by the following formula:

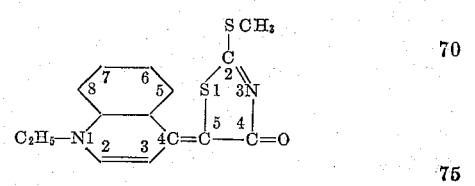

EXAMPLE 4.—5-(1-ethyl-2-quinolylidene)-2-methylthio-4(5)-thiazolone 0.36 g. (1 mol.) of 5-(1-ethyl-2-quinolylidene)-rhodanine was suspended in 25 cc. of methyl alcohol and 0.1 g. (1.2 mol.) of powdered potassium hydroxide (85%) was added, followed by 0.28 g. (1.2 mol) of methyl p-toluenesulfonate and the whole was refluxed for about 20 minutes. After recrystallization from glacial acetic acid the dye was obtained as yellow brown crystals.

In a similar manner, 5-(2-ethyl-1-benzothiazylidene)-rhodanine, 5-(2-methyl-1-benzoxazylidene)-rhodanine or any other simple merocyanine derived from rhodanine can be alkylated. A process for the preparation of these rhodanine dyes is described in my copending application Serial No. 739,502, filed August 11, 1934, and in the copending application of Leslie G. S. Brooker and Russel H. Van Dyke, Serial No. 29,917, filed July 5, 1935.

The new dyes where $n$ represents two can be prepared by condensing a cyclammonium quaternary salt, such as an oxazole, a thiazole, a thiazoline, a selenazole, a selenazoline, a pyridine or a quinoline quaternary salt, containing a β-anilinovinyl group in the alpha or gamma, i. e., one of the so-called reactive positions, with the herein disclosed thiazolones containing a reactive methylene group, advantageously in the presence of a basic condensing agent. The reaction can be illustrated by reference to the specific condensation of 1-(β-anilinovinyl)-benzoselenazole ethiodide with 2,4-dithio-2,4(3,5)-thiazoledione, in the presence of acetic anhydride and sodium acetate.

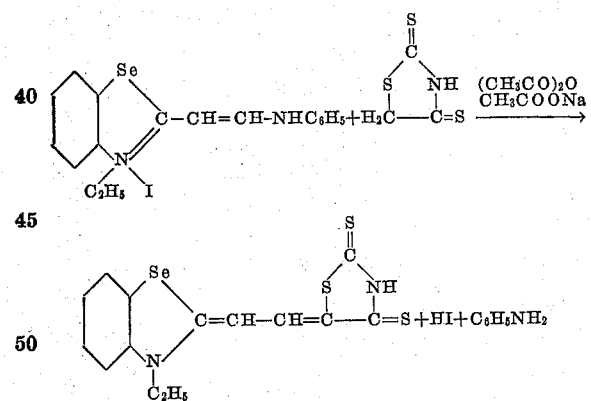

Such a dye is called 5-(2-ethyl-1-benzoselenazylidene - ethylidene)-2,4-dithio-2,4(3,5)-thiazoledione. In carrying out this type of condensation I have found it advantageous to employ the acetylated β-anilino derivative. The reaction can also be carried out in the presence of a strong organic base, such as triethylamine or piperidine, or an inorganic base, such as sodium carbonate. Heat accelerates the reactions.

The following examples serve to illustrate the procedure employed in preparing these new dyes where $n$ represents two. However, I do not intend that these examples limit my invention in any manner.

EXAMPLE 5.—5-(2-ethyl-1-benzoxazylidene-ethylidene)-2-methylphenylamino-4(5)-thiazolone 7.06 g. (1 mol.) of 2-methylphenylamino-4(5)-thiazolone (sometimes referred to as methylphenylisco-thio-hydantoin and a preparation for which is described by Dixon, J. Chem. Soc. 71, 629 (1897)), 4.34 g. (1 mol.) of 1-(β-acetanilidovinyl)-benzoxazole ethioide and 1.5 cc. (1.05 mol.) of triethylamine were refluxed in absolute ethyl alcohol (25 cc.) for about 10 minutes. After recrystallization from methyl alcohol, the dye was obtained as bright yellow crystals. The dye can be represented by the following formula:

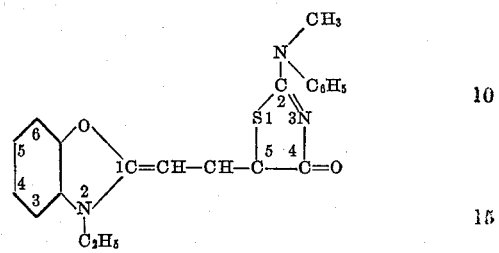

EXAMPLE 6.—5-(2-ethyl-1-benzoxazylidene-ethylidene)-2-ethylphenylamino-4(5)-thiazolone 2.2 g. (1 mol.) of 2-ethylphenylamino-4(5)-thiazolone (sometimes called ethylphenylisothio-hydantoin and a preparation for which is described by Andreasch in Berichte 31, 137 (1898)), 4.34 g. (1 mol.) of 1-(β-acetanilidovinyl)-benzoxazole ethiodide and 1.5 cc. (1.05 mol.) of triethylamine were refluxed in 25 cc. of absolute ethyl alcohol for about 10 minutes. The dye separated from the cooled solution. After recrystallization from methyl alcohol, it was obtained as dull yellow crystals.

EXAMPLE 7.—2-diphenylamino-5-(2-ethyl-1-benzoxazylidene-ethylidene-4(5)-thiazolone 1.34 g. (1 mol.) of 2-diphenylamino-4(5)-thiazoline (sometimes called diphenylisothiohydantoin and a preparation for which is described by Dixon and Taylor in J. Chem. Soc. 93, 689 (1908), 2.17 g. (1 mol.) of 1-(β-acetanilidovinyl)-benzoxazole ethiodide and 0.73 cc. (1.05 mol.) of triethylamine were refluxed in absolute ethyl alcohol (25 cc.) for about 10 minutes. The dye separated from the cooled reaction mixture. After recrystallization from methyl alcohol, the dye was obtained as yellowish orange plates.

EXAMPLE 8.—2-diphenylamino-5-(2-ethyl-1-benzothiazylidene-ethylidene)-4(5)-thiazolone 2.25 g. (1 mol.) of 1-(β-acetanilidovinyl)-benzothiazole ethiodide was treated exactly as the benzoxazole quaternary salt in the above example. The dye was obtained as deep amber colored needles with blue reflex. The dye can be represented by the following formula:

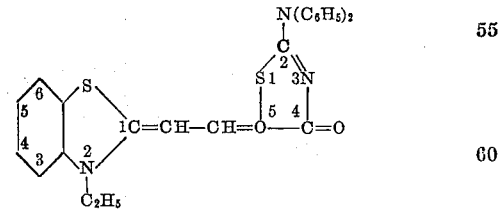

EXAMPLE 9.—5-(2-ethyl-1-benzothiazylidene-ethylidene)-2-ethylphenylamino-4(5)-thiazolone This dye was prepared as in Example 6, using 1 molecular proportion of 1-(β-acetanilidovinyl)-benzothiazole ethiodide. The dye was obtained as yellow orange needles.

EXAMPLE 10.—5-(1-ethyl-2-quinolylidene-ethylidene)-3-(p-tolyl)-2,4(3,5)-thiazoledione 1 g. (1 mol.) of 3-(p-tolyl)-2,4(3,5)-thiazoledione (Dains et al., J. Am. Chem. Soc. 43, 613

(1921)), 2.2 g. (1 mol.) of 2-(β-acetanilidovinyl)-quinoline ethiodide, 0.45 g. (1.1 mol.) of anhydrous sodium acetate in 20 cc. acetic anhydride were refluxed for about 5 minutes. The dye separated from the cooled reaction mixture. After recrystallization from glacial acetic acid, the dye was obtained as dark reddish brown crystals. The dye can be represented by the following formula:

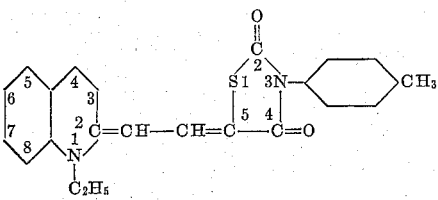

EXAMPLE 11.—5-(2-ethyl-1-benzoxazylidene-ethylidene)-3-phenyl-2,4(3,5)-thiazoledione 1.0 g. (1 mol.) of 3-phenyl-2,4(3,5)-thiazoledione (Markley and Reid, J. Am. Chem. Soc. 52, 2137 (1930)), 2.2 g. (1 mol.) of 1-(β-acetanilidovinyl)-benzoxazole ethiodide and 0.53 g. (1.05 mol.) of triethylamine were refluxed for 15 minutes in absolute ethyl alcohol (20 cc.). The dye separated from the cooled reaction mixture. After recrystallization from glacial acetic acid, the dye was obtained as minute orange crystals with a blue reflex.

EXAMPLE 12.—5-(2-ethyl-1-benzothiazylidene-ethylidene)-3-phenyl-2-phenylimino-4-thiazolidone 1.34 g. (1 mol.) of 3-phenyl-2-phenylimino-4-thiazolidone, 2.25 g. (1 mol.) of 1-(β-acetanilidovinyl)-benzothiazole ethiodide, 0.53 g. (1.05 mol.) of triethylamine were refluxed for about 15 minutes in 20 cc. of absolute ethyl alcohol. After recrystallization from glacial acetic acid, the dye was obtained as minute brownish crystals. The dye can be represented by the following formula:

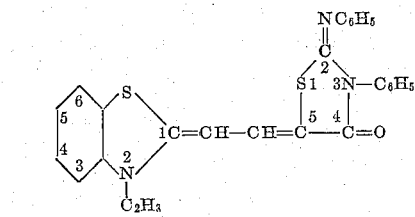

EXAMPLE 13.—5-(1-ethyl-2-quinolylidene-ethylidene)-3-phenyl-2-phenylimino-4-thiazolidone 1.34 g. (1 mol.) of 3-phenyl-2-phenylimino-4-thiazolidone, 2.2 g. (1 mol.) of 2-(β-acetanilidovinyl)-quinoline ethiodide, 0.45 g. (1.1 mol.) of sodium acetate in acetic anhydride (20 cc.) were refluxed for about 5 minutes. The dye separated from the cooled reaction mixture. After recrystallization from glacial acetic acid, the dye was obtained as a dull greenish powder.

EXAMPLE 14.—2-diphenylamino-5(1-ethyl-2-quinolylidene-ethylidene)-4(5)-thiazolone 2.68 g. (1 mol.) of (2-diphenylamino-4(5)thiazolone (diphenylisothiohydantoin), 4.02 g. (1 mol.) of 2-(β-acetanilidovinyl)-quinoline ethiodide, 0.96 g. (1.1 mol.) of anhydrous sodium acetate and 40 cc. of acetic anhydride were refluxed for about 12 minutes. The dye separated from the cooled reaction mixture. After recrystallization from glacial acetic acid, the dye was obtained as garnet crystals with a blue reflex.

EXAMPLE 15.—5-(2-ethyl-1-benzothiazylideneethylidene)-3-phenyl-2,4-dithio-2,4(3,5)-thiazoledione 1.1 g. (1 mol.) of 3-phenyl-2,4-dithio-2,4(3,5)-thiazoledione (3-phenyl-4-thio-rhodanine), 2.25 g. (1 mol.) of 1-(β-acetanilidovinyl-benzothiazole ethiodide and 0.53 g. (1.05 mol.) of triethylamine were refluxed in absolute ethyl alcohol for about 5 minutes. The dye separated from the cooled reaction mixture. After recrystallization from pyridine-ethyl alcohol mixture, the dye was obtained as minute purplish crystals. The dye can be represented by the following formula:

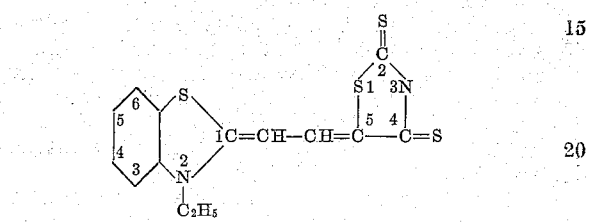

The 3-phenyl-4-thiorhodanine was prepared by heating 3-phenylrhodanine (10 g., 1 mol.) and dry toluene (200 cc.) to 110–120° on an oil bath and adding phosphorous pentasulfide (5.3 g., 0.5 mol.) mixed with an equal volume of clean sand; heating and stirring were continued for 15 minutes. The dark reddish toluene layer was decanted onto cracked ice, 10 cc. of 40% sodium hydroxide was added, and the aqueous layer separated, made acid with acetic acid, filtered, residue redissolved in dilute sodium hydroxide, solution filtered, filtrate chilled and made acid with dilute acetic acid. The separating solid was recrystallized from glacial acetic acid, then ligroin. The product was obtained as dark greenish yellow crystals, melting point 114–116° C. with decomposition. In a similar manner 3-alkyl-4-thiorhodanines can be prepared as well as 3-naphthyl-4-thiorhodanines.

Example 16.—2-diphenylamino-5-(1-ethyl-2-β-naphthothiazylidene-ethylidene)-4(5)-thiazolone 1.34 g. (1 mol.) of 2-diphenylamino-4(5)-thiazolone, 2.3 g. (1 mol.) of 2-(β-anilinovinyl)-β-naphthothiazole ethiodide and anhydrous sodium acetate, 0.45 g. (1.1 mol.) were refluxed in acetic anhydride (25 cc.) for about 20 minutes. After recrystallization from glacial acetic acid, the dye was obtained as reddish brown crystals, having a green reflex. The dye can be represented by the following formula:

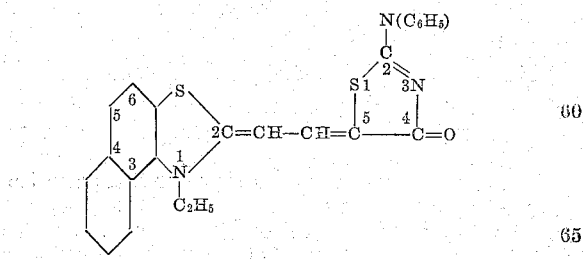

The 2-alkylarylamino-4(5)-thiazolones of the above examples can be replaced by 2-dialkylamino-4(5)-thiazolones prepared in a manner similar to that used for 2-alkylarylamino-4(5)-thiazolones. The 3-aryl-2,4(3,5)-thiazolediones of the above examples can be replaced by 2,4(3,5)-thiazoledione (thiocyanacetic acid) or by 3-alkyl-2,4(3,5)-thiazolediones. The 3-aryl-2-arylimino-4-thiazolidones can be replaced by 4-thiazolidone.

Thiazole, thiazoline, selenazoline, or oxazole quaternary salts containing a β-anilino group can also be used. The quaternary salt can be the alkyl halide, alkyl p-toluenesulfonates, alkyl sulfates, alkyl perchlorates or the like.

As indicated in the above three examples, the basis condensing agent can be a strong organic base, viz. triethylamine. Other strong organic bases suitable for the condensations are piperidine, triethanolamine, tributylamine and the like. Pyridine, though a weaker base, can be used. Still other basic condensing agents suitable for the condensations are potassium carbonate, sodium and potassium hydroxide and sodium ethoxide. Heat accelerates the condensations.

The most convenient method of preparing these new dyes, where n equals 2 and which are derived from a 2-substituted-mercapto- 4(5) - thiazolone, is to take a dye prepared as indicated in the above examples by condensing a cyclammonium quaternary salt, containing a β-anilinovinyl group in a reactive position, with rhodanine, i. e., 2-thio-2,4(3,5)-thiazoledione, and subject it to alkylation. The dyes derived from rhodanine are described in my copending application Serial No. 739,502, filed August 11, 1934. The following chemical equation illustrates the reaction of alkylation, using 5-(2 - ethyl - 1 - benzoxazylideneethylidene) -2-thio-2,4(3,5)-thiazoledione:

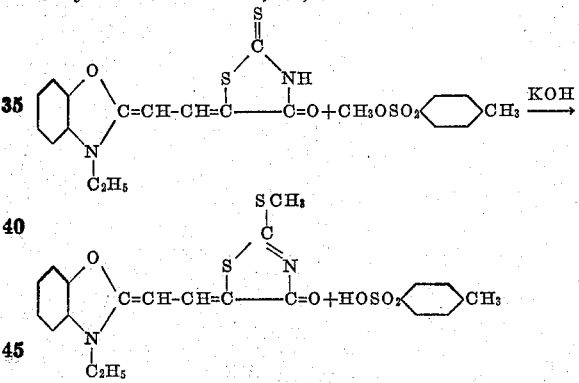

Such a dye is called 5-(2-ethyl-1-benzoxazylidene-ethylidene) -2-methylthio- 4(5) - thiazolone. The following examples serve to illustrate the preparation of dyes derived from 2-mercapto- 4(5)-thiazolones.

*Example 17.—5 - (2 - ethyl - 1 - benzoxazylidene-ethylidene) -2-methylthio-4(5) -thiazolone*

1.52 g. (1 mol.) of 5-(2-ethyl - 1 - benzoxazylidene-ethylidene)-rhodanine was suspended in 75 cc. methyl alcohol and 0.4 g. (1.2 mol.) of powdered potassium hydroxide (85%) were added followed by 1.12 g. (1.2 mol.) of methyl-p-toluenesulfonate. The whole was refluxed for about 20 minutes. The dye separated from the cooled reaction mixture. After three recrystallizations from glacial acetic acid the dye was obtained as an orange crystalline powder. The dye can be represented by the following formula:

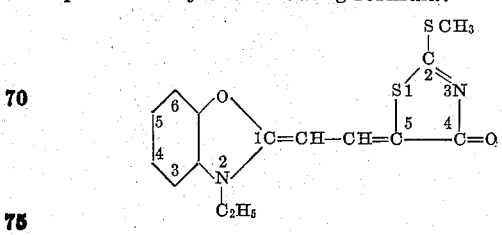

*Example 18.—5-(1 - ethyl-2-quinolylidene-ethylidene) -2-methylthio-4(5) -thiazolone*

1.57 g. (1 mol.) of 5-(1-ethyl-2-quinolylideneethylidene)-rhodanine was alkylated as in the above example. After recrystallization from glacial acetic acid, the dye was obtained as purplish crystals having a blue reflex.

Other alkylating agents, such as alkyl halides, alkyl sulfates and the like can be used in the presence of sodium or potassium hydroxide or carbonates. In a similar manner any merocarbocyanine derived from rhodanine (2-thio-2,4(3,5)-thiazoledione) can be alkylated.

These new dyes, where n represents three, can be prepared by condensing a cyclammonium quaternary salt, such as an oxazole, a thiazole, a thiazoline, a selenazoline, a selenazole, a pyridine or a quinoline quaternary salt, containing an ω-anilino Δ$^{1,3}$-butadienyl group in the alpha or gamma, i. e. one of the so-called reactive positions, with a thiazolone containing a reactive nuclear methylene group, advantageously in the presence of a basic condensing agent. The reaction can be illustrated by reference to the specific condensation of 1-(ω-anilino- Δ$^{1,3}$- butadienyl) - benzothiazole ethiodide with 2,4-dithio - 2,4(3,5) - thiazoledione, in the presence of triethylamine.

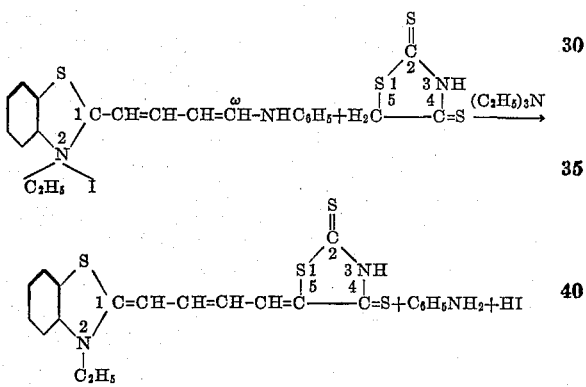

This dye is called 5-(2-ethyl-1-benzothiazylidene-butenylidene) -2,4-dithio- 2,4(3,5) - thiazoledione. In carrying out this type of condensation, I have found it advantageous to employ the acetylated β-anilino derivative. The ω-anilino-γ-bromo-Δ$^{1,3}$-butadienyl derivatives or their acetylated forms can also be used. The reaction can also be carried out in the presence of basic condensing agents, such as sodium carbonate or sodium acetate and acetate anhydride. Heat accelerates the condensations.

The following examples serve to illustrate the procedure employed in preparing these new dyes where n represents three. However, I do not intend that these examples limit my invention in any manner.

*Example 19.—2-diphenylamino- 5- (2 - ethyl - 1 - benzoxazylidene- butenylidene) - 4(5) - thiazolone*

1-(ω-acetanilido -Δ$^{1,3}$- butadienyl - benzoxazole ethiodide was prepared by refluxing 1-methylbenzoxazole ethiodide (8.7 g., 1 mol.) and β-anilinoacrolein anil hydrochloride (7.5 g., 1 mol.) in 60 cc. of acetic anhydride for about one hour. The cool reaction mixture was stirred with ether and allowed to stand for about 12 hours at 0° C. The ether was decanted off and the viscous mass stirred with acetone. Crystallization occurred, yielding a brownish yellow solid.

1.15 g. (1 mol.) of the butadienyl derivative, 0.7 g. (1 mol.) of 2-diphenylamino-4(5)-thiazolone and 0.25 g. (1 mol.) of triethylamine were refluxed in 10 cc. of absolute ethyl alcohol for about 10 minutes. The dye separated from the cold reaction mixture. After recrystallization from acetone, the dye was obtained as reddish purple crystals having a blue reflex. The dye can be represented by the following formula:

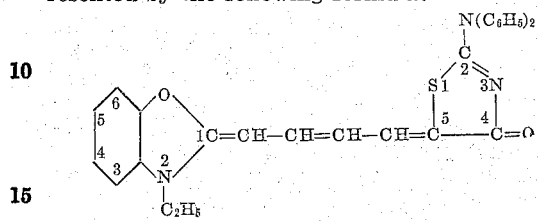

In the above examples, 2-diphenylamino-4(5)-thiazolone can be replaced by 2-ethylphenylamino or 2-diethylamino-4(5)-thiazolone or by 2,4-dithio-2,4(3,5)-thiazoledione, 4-thiazolidone or their nitrogen substituted derivatives or the like. Similarly, 1-methylbenzoxazole ethiodide can be replaced by other alkiodides or other quaternary salts, such as alkyl sulfates, alkyl-p-toluenesulfonates or alkyl bromides, for example. Likewise, 1-methylbenzoxazole, can be replaced by other nuclei, for example 1-methylbenzoxazole, 1-methyl-α-naphthothiazole, 2-methyl-β-naphthoxazole, quinaldine, lepidine, 1-ethylbenzothiazole, 2-methyl-selenazole or the like. The dyes prepared from 2-thio-2,4(3,5)-thiazoledione, as in the above examples, can be alkylated as illustrated in Examples 17 and 18.

As indicated in the above examples, the basic condensing agent can be a strong organic base, viz. triethylamine. Other strong organic bases suitable for the condensations are piperidine, triethanolamine, tributylamine and the like. Pyridine, though a weaker base, can be used. Still other basic condensing agents suitable for the condensations are potassium carbonate, sodium and potassium hydroxide and sodium ethoxide. Heat accelerates the condensations.

These new merocyanine dyes show a novel sensitizing action in photographic silver salt emulsions, particularly silver chloride and silver bromide emulsions. Accordingly, my invention is particularly directed to the customarily employed silver halide emulsions. However, the light-sensitive material employed in the emulsions of my invention can be any light-sensitive silver salt alone or combined with another light-sensitive silver salt, such as a silver halide. My invention is further particularly directed to the customarily employed gelatin emulsions, gelatin being the carrier or medium in which the light-sensitive salt is suspended. However, any other suitable carrier, such as a cellulose derivative or a synthetic resin, which has substantially no desensitizing effect on the silver salt, can be used.

Figure 2:
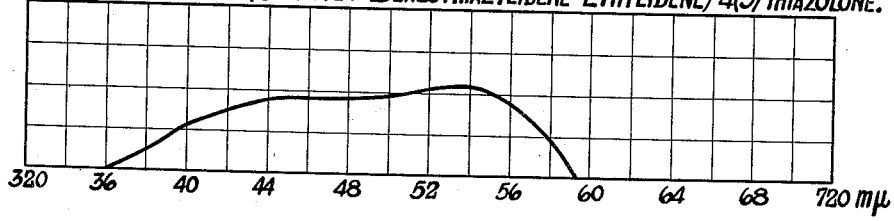
Figure 3:
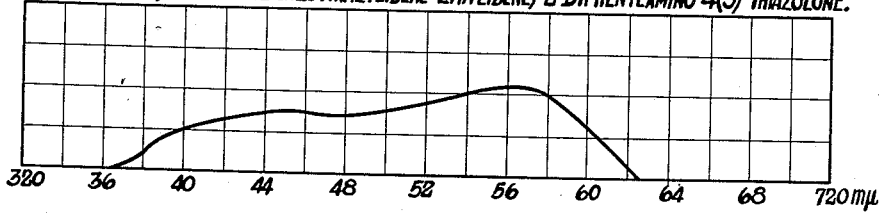
Figure 4:
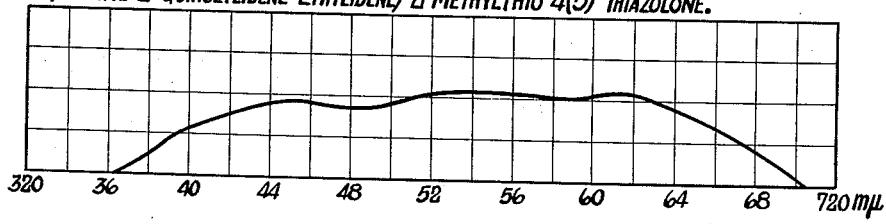
Figure 5:
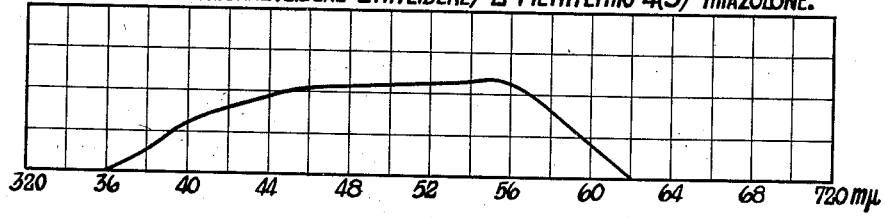
Figure 6:
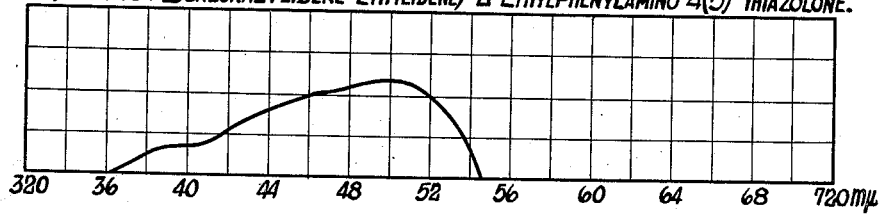
Figure 7:
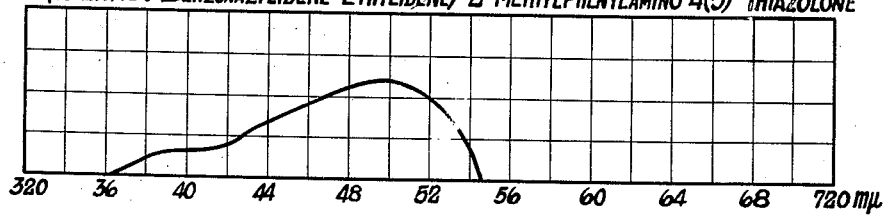
Figure 8:
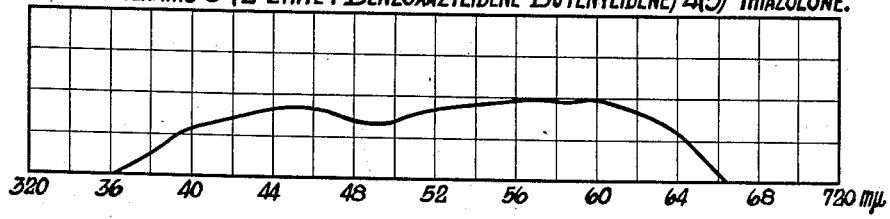

The sensitizing action of these new dyes will be illustrated with particular reference to silver bromide and silver chloride emulsions. The illustrations will be made with respect to dyes from 2-substituted-mercapto-4(5)-thiazolones and 2-substituted-amino-4(5)-thiazolones as these dyes are particularly useful. Fig. 1 depicts diagrammatically the sensitizing action of 5-(1-ethyl-4-quinolylidene)-2-ethylthio-4(5)-thiazolone in a bromide emulsion; Fig. 2 the sensitizing action of 2-diphenylamino-5-(2-ethyl-1-benzo-thiazylidene-ethylidene)-4(5)-thiazolone in a bromide emulsion; Fig. 3 the sensitizing action of 5-(2-ethyl-3,4-benzo-benzothiazylidene-ethylidene)-2-diphenylamino-4(5)-thiazolone in a bromide emulsion; Fig. 4 the sensitizing action of 5-(1-ethyl-2-quinolylidene-ethylidene)-2-quinolylidene-ethylidene)-2-methylthio-4(5)-thiazolone in a bromide emulsion; Fig. 5 the sensitizing action of 5-(2-ethyl-1-benzoxazylidene-ethylidene)-2-methylthio-4(5)-thiazolone in a bromide emulsion; Fig. 6 the sensitizing action of 5-(2-ethyl-1-benzoxazylidene-ethylidene)-2-ethylphenylamino-4(5)-thiazolone in a chloride emulsion; Fig. 7 the sensitizing action of 5-(2-ethyl-1-benzoxazylidene-ethylidene)-2-methylphenylamino-4(5)-thiazolone in a chloride emulsion; Fig. 8 the sensitizing action of 2-diphenylamino-5-(2-ethyl-1-benzoxazylidene-butenylidene)-4(5)-thiazolone in a bromide emulsion.

Some of the herein disclosed dyes have small desensitizing effects together with sensitizing effects in another range of the spectrum. The nuclei of the dyes may be substituted by methyl, chloro, alkoxyl, amino or the like groups.

In the preparation of photographic emulsions containing these new dyes, it is only necessary to disperse, homogenously and uniformly, from about 5 to about 100 mg. of the dye or mixture of dyes in about 1000 cc. of the flowable emulsion, the concentration of dye being varied according to the type of light-sensitive salt which goes to make up the emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol, acetone or pyridine and a volume of this solution (which may be diluted with water) containing from 5 to 100 mg. of dye is slowly added to about 1000 cc. of a gelatino-silver-halide emulsion with stirring. Stirring is continued until the dye is uniformly and practically homogeneously dispersed. With the more powerful of these new sensitizing dyes 10 to 20 mg. of dye per 1000 cc. of emulsion suffice to produce the maximum sensitizing effect with the ordinary gelatino-silver-halide emulsions. The above statements are only illustrative and not to be understood as limiting my invention in any sense, as it will be apparent that these dyes can be incorporated by other methods in many of the photographic emulsions customarily employed in the art, such, for instance, as bathing the plate or film, upon which the emulsion has been coated, in a solution of the dye in an appropriate solvent, although such a method is ordinarily not to be preferred. The claims are intended to cover any combination of these new dyes with a photographic silver salt emulsion whereby the dye exerts a sensitizing effect upon the emulsions as well as a photographic element comprising a support, ordinarily transparent, upon which the light-sensitive emulsion is coated or spread and permitted to dry.

It is to be understood that the herein disclosed dyes probably exist in two forms illustrated as follows:

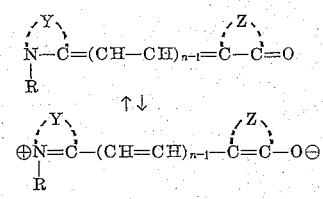

As illustrated these forms are interconvertible one into the other, i. e., the forms are virtual tautomers.

What I claim as my invention and desire to be secured by Letters Patent of the United States of America is:

1. A merocyanine dye characterized by one of the following two formulas:

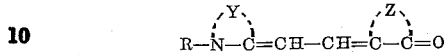

and

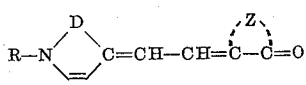

wherein D represents a phenylene group, R represents an alkyl group, Y represents the non-metallic atoms necessary to complete a heterocyclic nucleus selected from the group consisting of five-membered and six-membered heterocyclic nuclei and Z represents the non-metallic atoms necessary to complete a thiazolone nucleus selected from the group consisting of 2-alkylthiozolone and 2-diphenylamino-4(5)-thiazolone phenylamino-4(5)-thiazolone and 2-diphenylamino-4(5)-thiazolone nucleus.

2. A merocyanine dye characterized by the following formula:

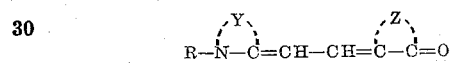

wherein R represents an alkyl group, Y represents the non-metallic atoms necessary to complete a heterocyclic nucleus selected from the group consisting of five-membered and six-membered heterocyclic nuclei and Z represents the non-metallic atoms necessary to complete a thiazolone nusceus selected from the group consisting of 2-alkylthio-4(5)-thiazolone, 2-alkylphenylamino-4(5)-thiazolone and 2-diphenylamino-4(5)-thiazolone nucleus.

3. A merocyanine dye characterized by the following formula:

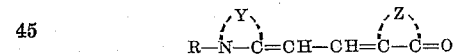

wherein R represents an alkyl group, Y represents the non-metallic atoms necessary to complete a five-membered heterocyclic nucleus and Z represents the non-metallic atoms necessary to complete a thiazolone nucleus selected from the group consisting of 2-alkylthio-4(5)-thiazolone, 2-alkylphenylamino-4(5)-thiazolone and 2-diphenylamino-4(5)-thiazolone nucleus.

4. A merocyanine dye characterized by the following formula:

wherein R represents an alkyl group, Y represents the non-metallic atoms necessary to complete an azole nucleus and Z represents the non-metallic atoms necessary to complete a 2-alkylthio-4(5)-thiazolone nucleus.

5. A merocyanine dye characterized by the following formula:

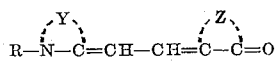

wherein R represents an alkyl group, Y represents the non-metallic atoms necessary to complete an oxazole nucleus and Z represents the non-metallic atoms necessary to complete a 2-alkylthio-4(5)-thiazolone nucleus.

6. A merocyanine dye characterized by the following formula:

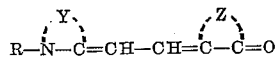

wherein R represents an alkyl group, Y represents the non-metallic atoms necessary to complete a benzoxazole nucleus and Z represents the non-metallic atoms necessary to complete a 2-alkylthio-4(5)-thiazolone nucleus.

7. A 5-(2-alkyl-1-benzoxazylidene-ethylidene)-2-methylthio-4(5)-thiazolone.

8. 5-(2-ethyl-1-benzoxazylidene-ethylidene)-2-methylthio-4(5)-thiazolone.

9. A merocyanine dye characterized by the following formula:

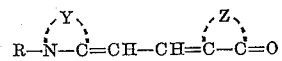

wherein R represents an alkyl group, Y represents the non-metallic atoms necessary to complete an azole nucleus and Z represents the non-metallic atoms necessary to complete a 2-diphenylamino-4(5)-thiazolone nucleus.

10. A merocyanine dye characterized by the following formula:

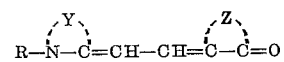

wherein R represents an alkyl group, Y represents the non-metallic atoms necessary to complete an oxazole nucleus and Z represents the non-metallic atoms necessary to complete a 2-diphenylamino-4(5)-thiazolone nucleus.

11. A merocyanine dye characterized by the following formula:

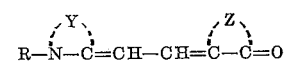

wherein R represents an alkyl group, Y represents the non-metallic atoms necessary to complete a thiazole nucleus and Z represents the non-metallic atoms necessary to complete a 2-diphenylamino-4(5)-thiazolone nucleus.

12. A merocyanine dye characterized by the following formula:

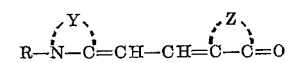

wherein R represents an alkyl group, Y represents the non-metallic atoms necessary to complete a benzoxazole nucleus and Z represents the non-metallic atoms necessary to complete a 2-diphenylamino-4(5)-thiazolone nucleus.

13. A merocyanine dye characterized by the following formula:

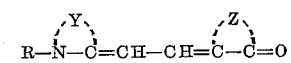

wherein R represents an alkyl group, Y represents the non-metallic atoms necessary to complete a benzothiazole nucleus and Z represents the non-metallic atoms necessary to complete a 2-diphenylamino-4(5)-thiazolone nucleus.

14. A 2-diphenylamino-5-(2-alkyl-1-benzoxazylidene-ethylidene)-4(5)-thiazolone.

15. 2-diphenylamino-5-(2-ethyl-1-benzoxazylidene-ethylidene)-4(5)-thiazolone.

16. A 2-diphenylamino-5-(2-alkyl-1-benzothiazylidene-ethylidene)-4(5)-thiazolone.

17. 2-diphenylamino-5-(2-ethyl-1-benzothiazylidene-ethylidene)-4(5)-thiazolone.

LESLIE G. S. BROOKER.

CERTIFICATE OF CORRECTION.

Patent No. 2,177,402.  October 24, 1939.

LESLIE G. S. BROOKER.

It is hereby certified that error appears in the printed specification of the above numbered patent requiring correction as follows: Page 2, second column, line 42, in the formula, for "—$\overset{S}{\underset{|}{C}}$" read =$\overset{S}{\underset{|}{C}}$; page 3, first column, line 72-73, Example 5, for "methylphenylisco" read methylpheniliso; and second column, line 34-35, Example 7, for "thiazoline" read thiazolone; line 59, in the formula, for "CH=O" read CH=C; page 4, first column, line 52, in the formula, for "$C_2H_3$" read $C_2H_5$; page 7, first column, line 38, claim 2, for "nuscleus" read nucleus; and that the said Letters Patent should be read with this correction therein that the same may conform to the record of the case in the Patent Office.

Signed and sealed this 2nd day of January, A. D. 1940.

Henry Van Arsdale,
Acting Commissioner of Patents.

(Seal)